(12) United States Patent
Yu et al.

(10) Patent No.: US 8,073,393 B2
(45) Date of Patent: Dec. 6, 2011

(54) METHODS AND SYSTEMS FOR LEAST SQUARES BLOCK CHANNEL ESTIMATION

(75) Inventors: Yuanning Yu, Santa Clara, CA (US); James Y. Hurt, San Diego, CA (US); Jong Hyeon Park, San Jose, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 527 days.

(21) Appl. No.: 12/365,896

(22) Filed: Feb. 5, 2009

(65) Prior Publication Data

US 2010/0197254 A1   Aug. 5, 2010

(51) Int. Cl.
H04B 17/00 (2006.01)
H04B 7/204 (2006.01)

(52) U.S. Cl. ............ 455/67.11; 455/450; 455/464; 375/349; 375/350; 370/319; 370/320

(58) Field of Classification Search ........... 455/67.11, 455/450, 464; 375/349–350; 370/319–321
See application file for complete search history.

(56) References Cited

U.S. PATENT DOCUMENTS

| | | | | |
|---|---|---|---|---|
| 6,631,168 | B2 * | 10/2003 | Izumi | 375/295 |
| 6,947,475 | B2 * | 9/2005 | Sendonaris et al. | 375/148 |
| 7,355,961 | B2 * | 4/2008 | Tirkkonen | 370/208 |
| 7,477,703 | B2 * | 1/2009 | Hottinen et al. | 375/299 |
| 7,668,269 | B2 * | 2/2010 | Ma et al. | 375/350 |
| 2005/0105647 | A1 | 5/2005 | Wilhelmsson et al. | |
| 2007/0217615 | A1 | 9/2007 | Rajagopal et al. | |
| 2008/0049814 | A1 | 2/2008 | Jeon | |
| 2008/0062859 | A1 | 3/2008 | Le Saux et al. | |

FOREIGN PATENT DOCUMENTS

EP   1746794 A2   1/2007

OTHER PUBLICATIONS

International Search Report and Written Opinion—PCT/US2010/023250, International Search Authority—European Patent Office—Dec. 27, 2010.
Ozdemir, Mehmet Kemal et al.: "Channel Estimation for Wireless OFDM Systems," XP011186984, IEEE Communications Surveys & Tutorials, ISSN: 1553-877X, 2nd Quarter 2007, 9(2), p. 18-48.
Wireless Communication, Section 3.2.1, pp. 71-77, by Andrea Goldsmith, Cambridge University Press, 2005.
Martrix Analysis for Scientists and Engineers, Chapter 1, pp. 1-6, by Alan J. Laub, University of California, Davis California, Society of Industrial & Applied Mathematics, 2005.
A Comparison of Pilot-Aided Channel Estimation Methods for OFDM Systems, by Michele Morelli et al., IEEE Transactions on Signal Processing, vol. 49, No. 12, pp. 3065-3073, Dec. 2001.

* cited by examiner

*Primary Examiner* — Kenneth B. Wells
(74) *Attorney, Agent, or Firm* — Charles Chesney

(57) ABSTRACT

Certain embodiments of the present disclosure provide techniques for channel estimation without resorting to the channel second-order statistics. Methods and systems are proposed for improving the performance of an un-constrained least squares channel interpolator by using available side information of the channel, such as signal-to-noise ratio (SNR), Doppler frequency and/or delay spread.

36 Claims, 13 Drawing Sheets

METHODS AND SYSTEMS FOR LEAST SQUARES BLOCK CHANNEL ESTIMATION

TECHNICAL FIELD

The present disclosure generally relates to communication, and more specifically to a method for channel estimation without knowledge of the channel second-order statistics.

SUMMARY

Certain embodiments of the present disclosure provide a method for performing a channel estimation. The method generally includes receiving wireless signals on a channel having channel information, selecting a first set of tuning parameters, updating of a second set of tuning parameters of a channel model based at least on the selected first set of tuning parameters and the channel information, augmenting an observation matrix with a sparse matrix having non-zero elements on the main diagonal taken from the second set of tuning parameters, computing a pseudo-inverse of the augmented observation matrix, computing an effective interpolation matrix based on the pseudo-inverse of the augmented observation matrix and an interpolation matrix for the entire channel response, and computing channel estimates based on the effective interpolation matrix and known channel estimates at pilot locations.

Certain embodiments of the present disclosure provide an apparatus for performing a channel estimation. The apparatus generally includes logic for receiving wireless signals on a channel having channel information, logic for selecting a first set of tuning parameters, logic for updating of a second set of tuning parameters of a channel model based at least on the selected first set of tuning parameters and the channel information, logic for augmenting an observation matrix with a sparse matrix having non-zero elements on the main diagonal taken from the second set of tuning parameters, logic for computing a pseudo-inverse of the augmented observation matrix, logic for computing an effective interpolation matrix based on the pseudo-inverse of the augmented observation matrix and an interpolation matrix for the entire channel response, and logic for computing channel estimates based on the effective interpolation matrix and known channel estimates at pilot locations.

Certain embodiments of the present disclosure provide an apparatus for performing a channel estimation. The apparatus generally includes means for receiving wireless signals on a channel having channel information, means for selecting a first set of tuning parameters, means for updating of a second set of tuning parameters of a channel model based at least on the selected first set of tuning parameters and the channel information, means for augmenting an observation matrix with a sparse matrix having non-zero elements on the main diagonal taken from the second set of tuning parameters, means for computing a pseudo-inverse of the augmented observation matrix, means for computing an effective interpolation matrix based on the pseudo-inverse of the augmented observation matrix and an interpolation matrix for the entire channel response, and means for computing channel estimates based on the effective interpolation matrix and known channel estimates at pilot locations.

Certain embodiments of the present disclosure provide a computer-program product for performing a channel estimation, comprising a computer readable medium having instructions stored thereon, the instructions being executable by one or more processors. The instructions generally include instructions for receiving wireless signals on a channel having channel information, instructions for selecting a first set of tuning parameters, instructions for updating of a second set of tuning parameters of a channel model based at least on the selected first set of tuning parameters and the channel information, instructions for augmenting an observation matrix with a sparse matrix having non-zero elements on the main diagonal taken from the second set of tuning parameters, instructions for computing a pseudo-inverse of the augmented observation matrix, instructions for computing an effective interpolation matrix based on the pseudo-inverse of the augmented observation matrix and an interpolation matrix for the entire channel response, and instructions for computing channel estimates based on the effective interpolation matrix and known channel estimates at pilot locations.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
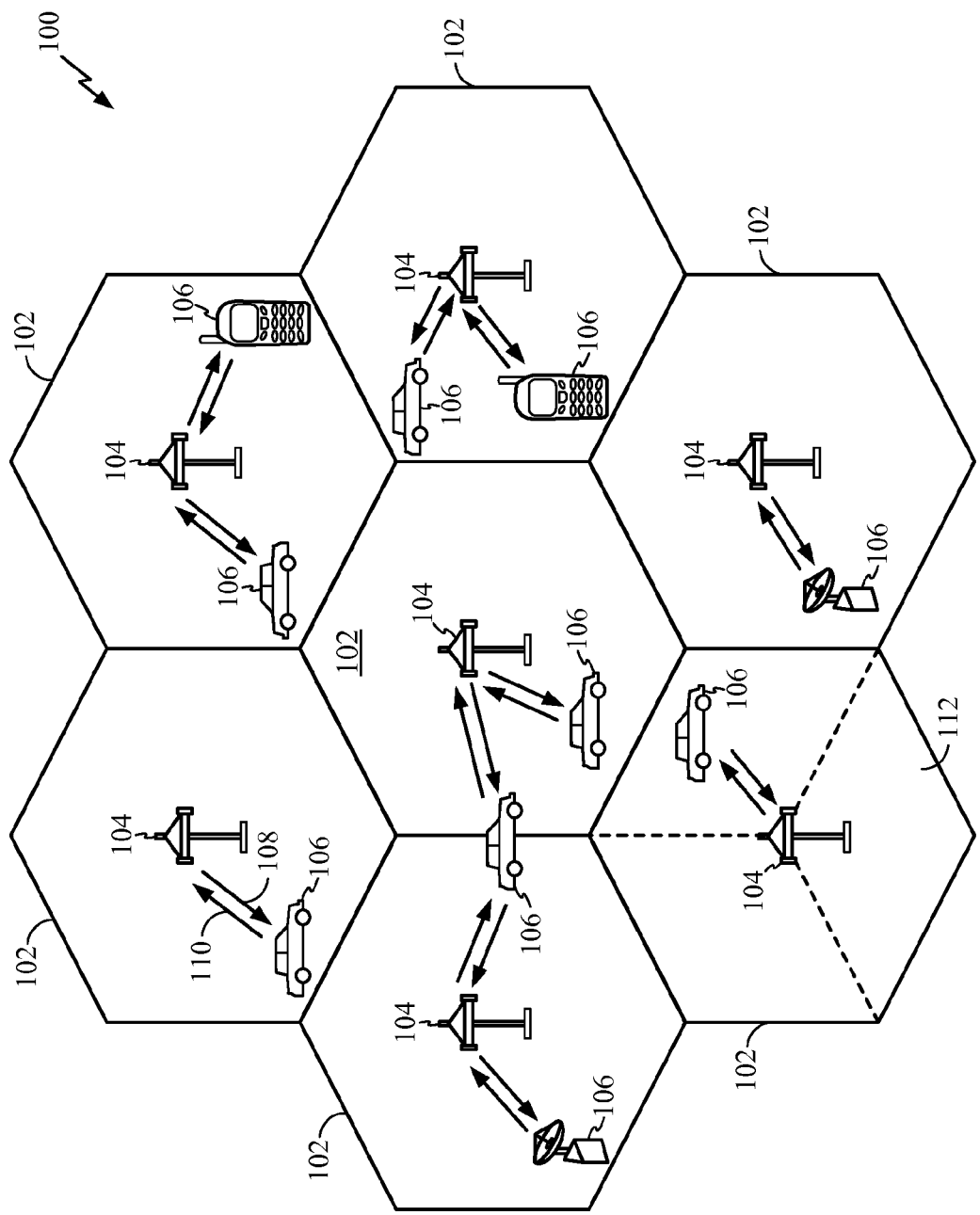
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

In a wireless communication system such as an Orthogonal Frequency Division Multiple Access (OFDMA) system and an Orthogonal Frequency Division Multiplexing (OFDM) system, it is often required to estimate a response of a wireless channel from a transmitter to a receiver. The channel estimate may be utilized for various purposes such as data detection, time synchronization, frequency correction, spatial processing, rate selection, etc. Channel estimation algorithms are typically based on a transmission of pilot symbols known a priori by both the transmitter and the receiver.

The pilot symbols may be transmitted on the specific frequency bins (subcarriers). Therefore, channel estimates of these particular frequency subcarriers may be directly obtained by observing the received pilot symbols. On the other hand, channel estimates at frequency subcarriers utilized for transmission of data symbols may be calculated by interpolating previously computed channel estimates at pilot subcarriers.

For example, the well known Wiener interpolator may provide excellent accuracy of interpolated channel estimates. Although the Wiener interpolator may be the best linear interpolator in the sense of minimizing the mean square error (MSE) between real and estimated channel response, the Wiener interpolator may depend on the knowledge of a channel correlation model (e.g., a two-dimensional autocorrelation and a one-dimensional cross-correlation) that may not be easy to obtain before estimating the channel.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
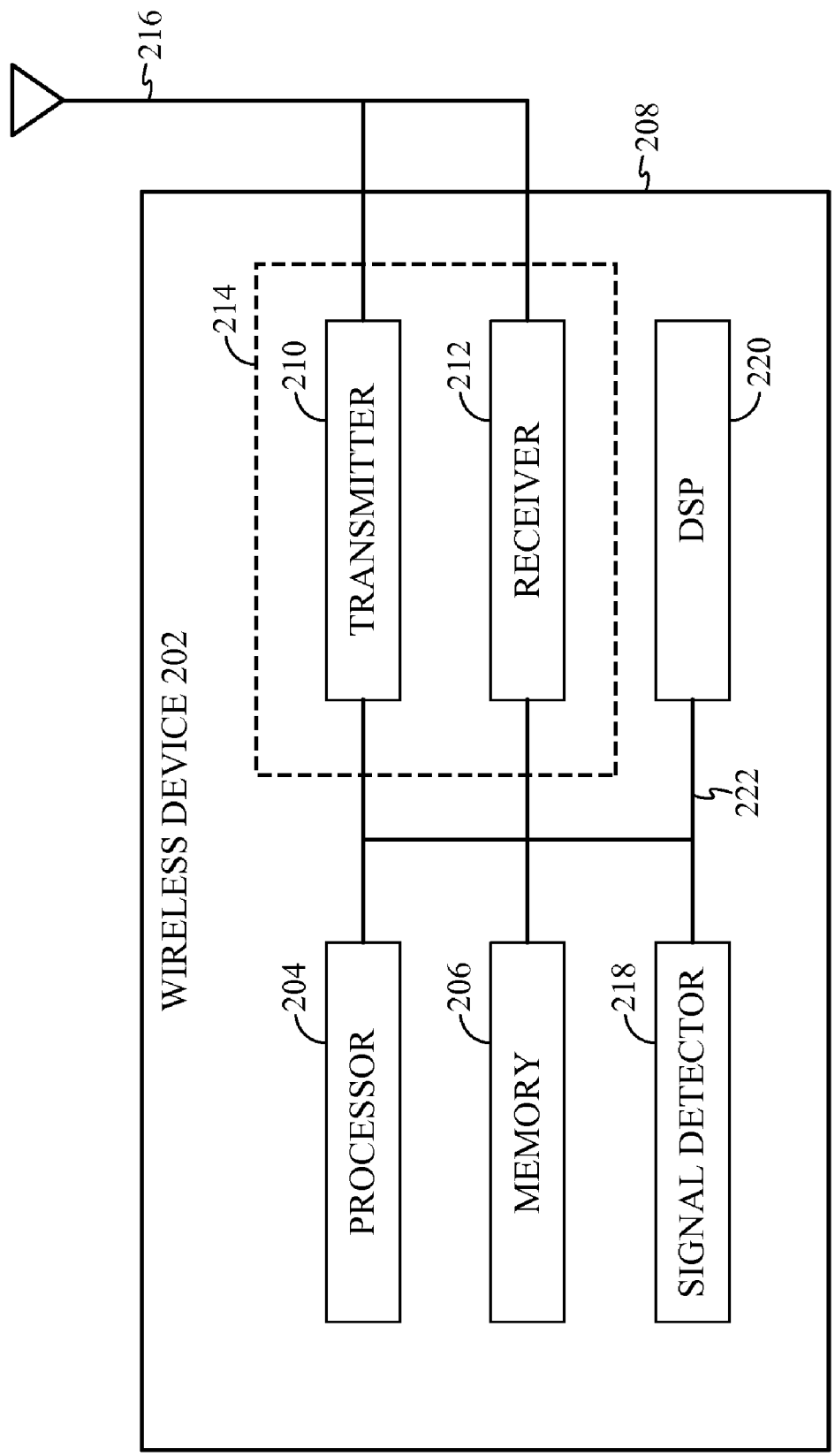
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
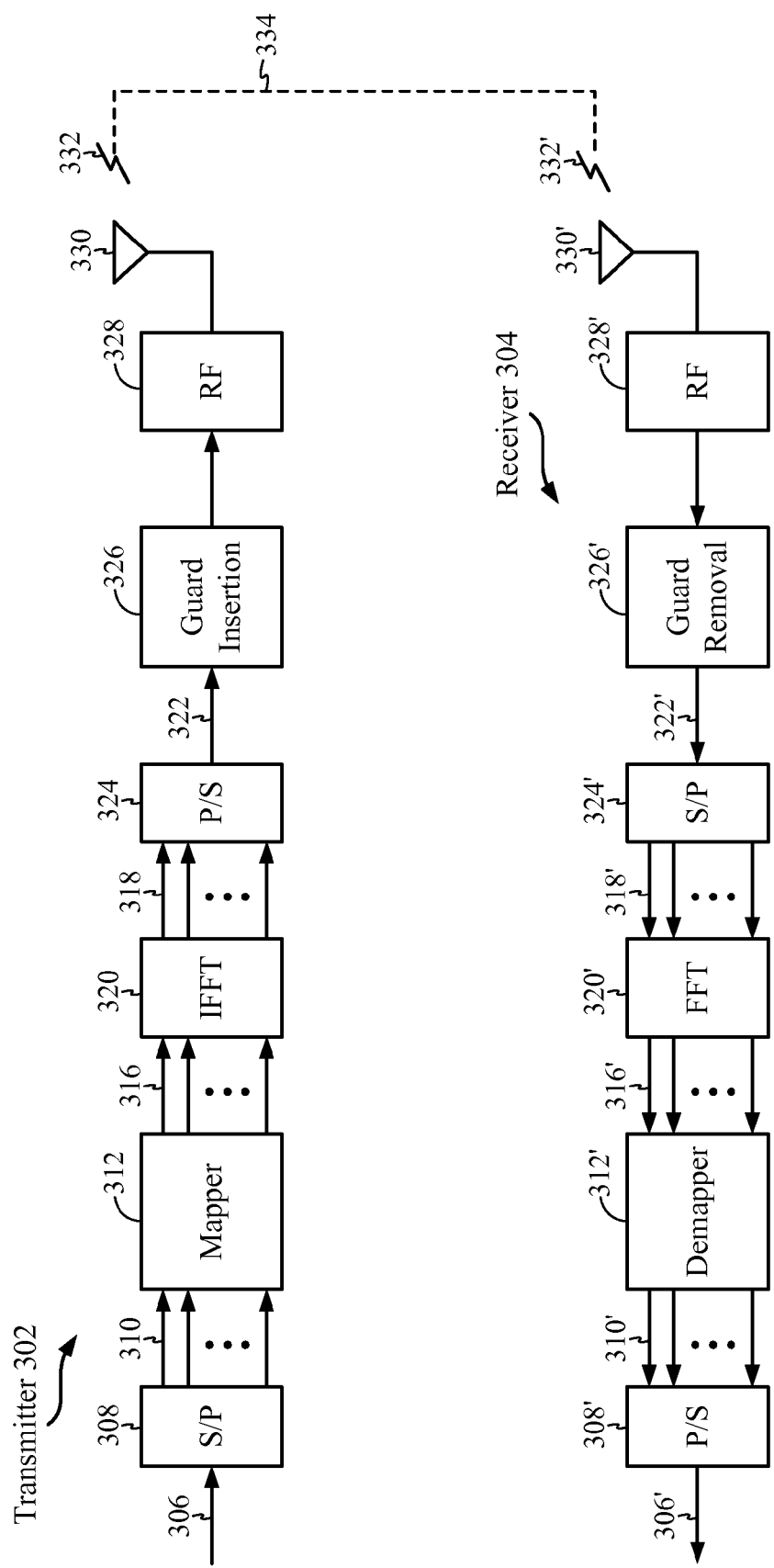
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

Exemplary Block Channel Estimation

The present disclosure proposes a block channel estimation/interpolation scheme based on the least square (LS) algorithm with automatic tuning of parameters, which does not rely on a channel correlation model. It can be shown that an accuracy of the LS-based channel interpolator may be improved by utilizing side information about channel condition. The LS-based channel estimation may be automatically tuned for different values of signal-to-noise ratio (SNR), Doppler frequency and channel delay spread, which can be obtained from a frequency tracking loop, a time tracking loop and a preamble channel estimation.

A statistical description of the second order statistics of the frequency-time channel model is first overviewed, and then the optimal well-known linear two-dimensional Wiener interpolator is described. After that, the least square (LS) block channel estimation based on plane fitting which does not utilize the channel second order statistics is presented. The LS-based block channel estimation with automatic tuning of parameters (e.g., K factors) is proposed that exploits information about channel condition, and reduces a gap in estimation accuracy between the LS-based interpolator and the optimal Wiener interpolator. A computationally efficient implementation of the LS-based block channel interpolator with automatically tuned K factors is also proposed in the present disclosure. Finally, analytical results of the channel estimation mean square error for different channel interpolators are evaluated and compared.

Exemplary System Model and Channel Estimation Mean Square Error

A frequency channel response h(f,t) may represent a complex-valued number on a frequency-time grid. It can be assumed that the frequency channel response is a two-dimensional (2D) zero-mean wide-sense stationary (WSS) process with the second order correlation given as:

$$E[h(f+\Delta f, t+\Delta t)h^*(f,t)] = R_h(\Delta t, \Delta f), \quad (1)$$

where $\Delta f$ is a gap between particular frequency subcarriers, and $\Delta t$ is a time gap between particular OFDM/OFDMA symbols.

Without loss of generality, for an isotropic scattering model with independent channel taps, the 2D correlation of the channel response may be separated into two one-dimensional correlation functions. Therefore, the second order correlation from equation (1) may be written as:

$$R_h(\Delta t, \Delta f) = R_h(\Delta t) R_h(\Delta f), \quad (2)$$

where $$R_h(\Delta t) = J_0(2\pi f_d \Delta t), \quad (3)$$

$$R_h(\Delta f) = \sum_{i=1}^{L} P_i e^{j 2\pi \Delta f \tau_i}. \quad (4)$$

$f_d$ is a Doppler frequency of the channel, $J_0(x)$ is the Bessel function of the first kind defined as:

$$J_0(x) = \sum_{m=0}^{\infty} \frac{(-1)^m}{(m!)^2} \left(\frac{x}{2}\right)^{2m}, \quad (5)$$

and $P_i$ is an expected power of the ith channel path delayed by $\tau_i$.

Figure 4:
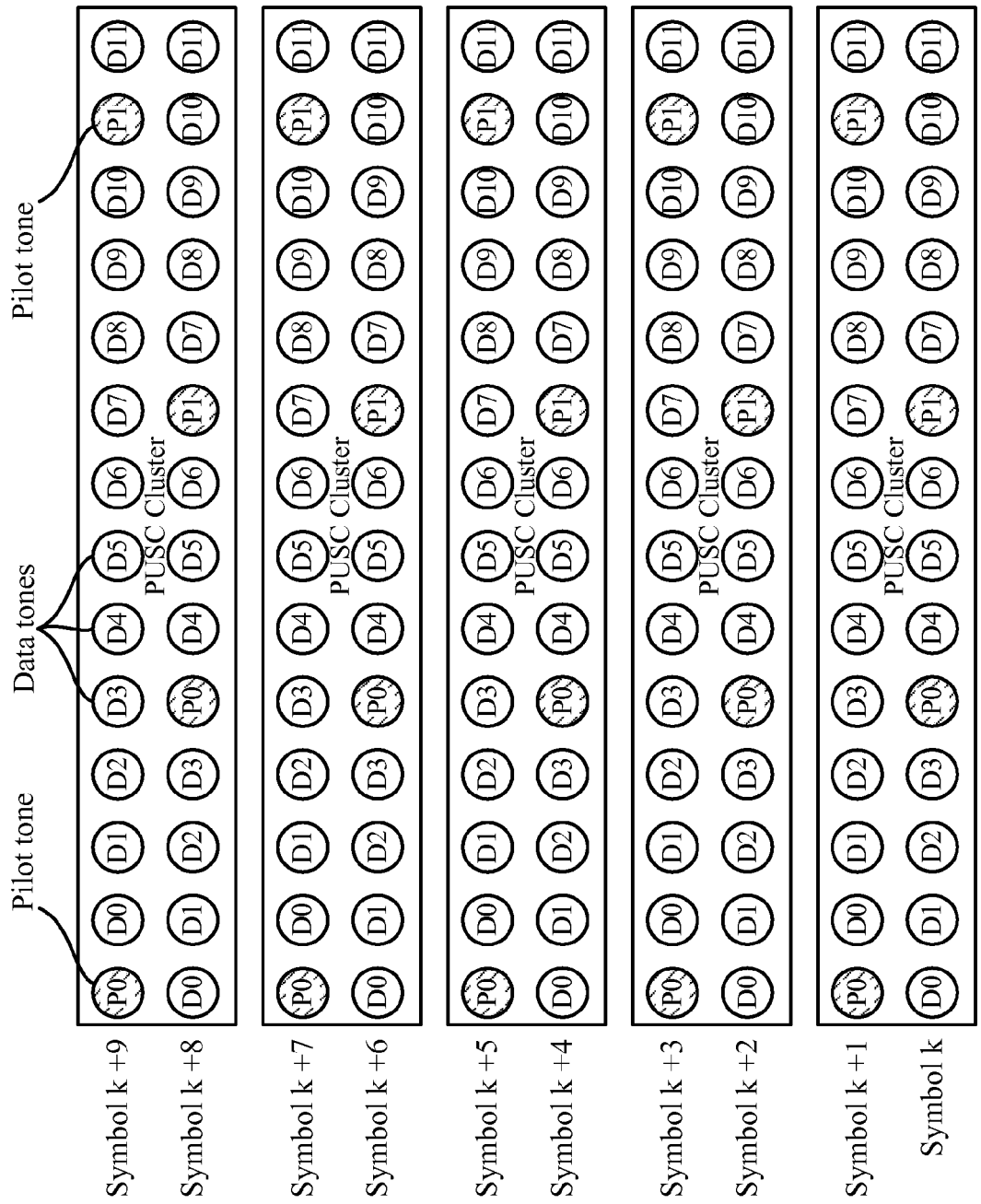
FIG. 4 illustrates a pilot structure for partially used subcarrier (PUSC) zone of the WiMAX system in accordance with certain embodiments of the present disclosure.

Let $H_p$ denotes the noisy observation of the channel response at the pilot subcarriers, and H denotes the frequency channel response on the entire signal plane. As an illustrative example, FIG. 4 illustrates the pilots/data tones structure for a partially used subcarrier (PUSC) zone of the WiMAX system. The signal plane in the PUSC zone may be composed of 10 OFDM symbols with 14 subcarriers in each OFDM symbol. Therefore, it can be assumed that H has dimension of 140×1 (14 subcarriers and 10 OFDM symbols in the signal plane). There may be two pilot tones within one OFDM symbol, as illustrated in FIG. 4. Therefore, there may be 20 pilot locations within the signal plane, and $H_p$ may have dimension of 20×1.

The optimal channel interpolator in terms of minimizing the MSE may be obtained as:

$$G = \arg \min_{G} \text{trace} \ (E\{(H - GH_p)(H - GH_p)^H\}). \quad (6)$$

By taking a derivative of equation (6) with respect to the interpolation matrix G, the solution for channel estimation may be obtained by applying the 2D Wiener interpolator:

$$H_{MMSE} = \underbrace{\left(\left(R_{H_p H_p} + \sigma^2 I\right)^{-1} R_{H_p H}\right)^H}_{G_{MMSE}} H, \quad (7)$$

where $R_{H_p H_p}$ is an auto-correlation matrix of size (20×20) of the channel response at the pilot subcarriers, and $R_{H_p H}$ is a cross-correlation vector between the channel response at the pilot subcarriers $H_p$ and the desired channel response in the whole plane H.

The minimum MSE of the optimal Wiener interpolator may be expressed as:

$$MMSE = \text{trace}(R_{HH} - R_{HH_p}(R_{H_p H_p} + \sigma^2 I)^{-1} R_{HH_p}). \quad (8)$$

Moreover, for any linear interpolator G, the MSE of channel estimates may be computed as:

$$MSE(G) = \text{trace}(R_{HH} - R_{HH_p} G^H - G R_{H_p H} + G(R_{H_p H_p} + \sigma^2 I) G^H). \quad (9)$$

Although the Wiener interpolator given by equation (7) is the best linear interpolator in terms of minimizing the MSE, the Wiener interpolator may depend on the channel correlation model, which may not be possible to obtain before estimating the channel response. The present disclosure proposes a least square based plane-fitting method for channel estimation, which does not utilize the channel correlation model while providing excellent estimation accuracy.

Exemplary Channel Estimation Based on Least Square Fitting

Based on expected channel coherence time and channel coherence bandwidth, a parametric channel model may be considered over a finite frequency range and time interval. The parametric channel model may describe the channel response at every frequency subcarrier and at every symbol time in the signal plane.

The following model may be assumed for the channel response at the arbitrary frequency subcarrier f and at the arbitrary time slot t:

$$h(f, t) = h(t_0, f_0) + \Delta t \frac{\partial h}{\partial t} + \Delta f \frac{\partial h}{\partial f} + \frac{1}{2} \Delta t^2 \frac{\partial^2 h}{\partial t^2} + \frac{1}{2} \Delta f^2 \frac{\partial^2 h}{\partial f^2} + \Delta t \Delta f \frac{\partial^2}{\partial t \partial f} + o(\Delta t^2, \Delta f^2) + n, \quad (10)$$

where $$\Delta t = \frac{t - t_o}{T_s},$$

$$\Delta f = \frac{f - f_o}{f_{sc}},$$

$f_{sc}$ is the subcarrier spacing, $T_S$ is the symbol time, and $(t_o, f_o)$ is the center of the plane to be fitted, $o(\Delta t^2, \Delta f^2)$ represents the higher order model error, and n is the Additive White Gaussian Noise (AWGN) with zero mean and variance $\sigma^2$. The following parameters may be defined:

$$\frac{1}{2} \frac{\partial^2 h}{\partial f^2} \equiv \theta_{f^2}$$

is one half of the second order derivative in frequency, $$\frac{\partial h}{\partial f} \equiv \theta_f$$

is the slope in frequency, $$\frac{1}{2} \frac{\partial^2 h}{\partial t^2} \equiv \theta_{t^2}$$

is one half of the second order derivative in time, $$\frac{\partial h}{\partial f} \equiv \theta_t$$

is the slope in time, $$\frac{\partial^2 h}{\partial t \partial f} \equiv \theta_{tf}$$

is the second order derivative in time and frequency, and $h(t_0,f_0) \equiv \theta_{DC}$ is the DC term.

Based on the channel model given by equation (10), the channel response observed at the pilot locations may be expressed as:

$$H_p = A\theta + e, \tag{11}$$

where $H_p$ is a column vector representing the noisy pilot observables, A is the observation matrix, vector e is a column vector that includes the observation noise, interference and higher order model error, and θ is a column vector consisting of previously defined parameters $\theta_{t^2}, \theta_{f^2}, \theta_{tf}, \theta_t, \theta_f, \theta_{DC}$ to be estimated:

$$\theta = \begin{bmatrix} \theta_{t^2} \\ \theta_{f^2} \\ \theta_{tf} \\ \theta_t \\ \theta_f \\ \theta_{DC} \end{bmatrix}. \tag{12}$$

The least square (LS) estimator for the set of parameters from equation (12) may be given as:

$$\theta_{LS} = (A^T A)^{-1} A^T H_p = A^\# H_p, \tag{13}$$

where matrix $A^\#$ denotes the left pseudo-inverse of the observation matrix A. The linear LS solution represented by equation (13) may fit the quadratic plane such that the error residual may be minimized. After obtaining the LS estimation of the parameter set from equation (12), the channel response in the whole signal plane may be estimated as:

$$H = \underbrace{TA^\#}_{G_{LS}} H_p, \tag{14}$$

where T is an interpolation matrix for computing the channel response on the whole signal plane. The MSE of channel estimates from equation (14) may be then calculated according to equation (9).

Exemplary Least Square Estimation with Automatically Tuned K Factors

A set of orthogonal bases in the quadratic fitting plane may not be available in the WiMAX system. Therefore, in order to constrain the channel estimation parameters from equation (12) if the level of signal-to-noise ratio (SNR), channel delay spread and Doppler spread are known or can be estimated, the observation matrix A given by equation (11) may be augmented along with the pilot observables as follows:

$$A_{Aug} = \begin{bmatrix} A \\ K_{Aug} \end{bmatrix} = \begin{bmatrix} A \\ k_{t^2} & 0 & 0 & 0 & 0 & 0 \\ 0 & k_{f^2} & 0 & 0 & 0 & 0 \\ 0 & 0 & k_{tf} & 0 & 0 & 0 \\ 0 & 0 & 0 & k_t & 0 & 0 \\ 0 & 0 & 0 & 0 & k_f & 0 \end{bmatrix}, \tag{15}$$

where K factors from $K_{Aug}$ can be defined similarly as channel parameters given by equation (12). It can be noted from equation (15) that the constant term $h(t_0,f_0)=c$ of the channel model defined in equation (10) may be excluded from the analysis, and fitting of linear and second order K factors may only be considered.

Equation (11) may be now written as:

$$A_{Aug} \cdot \theta = \tilde{H}_{p,Aug}, \tag{16}$$

where $$\tilde{H}_{p,Aug} = \begin{bmatrix} H_p \\ 0 \\ 0 \\ 0 \\ 0 \\ 0 \end{bmatrix}. \tag{17}$$

The effective interpolation matrix may be obtained after assuming the channel model with five K fitting factors given by equation (15) and for the exemplary case of N=20 pilot subcarriers in the signal plane:

$$G_{Aug} = TA_{Aug}^\# [I_{20 \times 20}, 0_{5 \times 20}]^T. \tag{18}$$

Therefore, the channel on the whole signal plane may be estimated as:

$$H = G_{Aug} H_p. \tag{19}$$

The mean square errors (MSE) of different channel estimation algorithms are provided in the present disclosure for various channel settings. It can be shown that the choice of fitting parameters may depend on three main factors: the SNR value, the Doppler frequency and the channel delay spread. As an illustrative example, for a high level of SNR, when Doppler frequency is also high (e.g., high velocity of a subscriber station), the term corresponding to the second order derivative in time may need to be included in the channel model. Similarly, when the channel delay spread is high, the term corresponding to the second order derivative in frequency may need to be included in the channel model.

For certain embodiments of the present disclosure, an automatic tuning of K factors may be performed for known level of SNR, channel delay spread, and Doppler frequency. Considering that the large signal plane may need to be fit, the constant term and two linear terms $k_t$ and $k_f$ of the channel model given by equation (10) may be set to zero. Therefore, the remaining three factors of higher order may need to be controlled.

The following parameter settings may be utilized:

$$k_{f^2}(SNR, \tau_d) = \frac{1}{C_{f^2,2} \cdot \tau_d \cdot SNR + C_{f^2,1}}, \tag{20}$$

$$k_{t2}(SNR, f_d) = \frac{1}{C_{t2,2} \cdot f_d \cdot SNR + C_{t2,1}}, \quad (21)$$

$$k_{tf}(SNR, \tau_d f_d) = \frac{1}{C_{tf,2} \cdot \sqrt{f_d \tau_d} \cdot SNR + C_{tf,1}}, \quad (22)$$

where $C_{f^2,1}$, $C_{f^2,2}$, $C_{t^2,1}$, $C_{t^2,2}$, $C_{tf,1}$, $C_{tf,2}$ are six parameters that may need to be pre-tuned, $f_d$ is the Doppler frequency, and $\tau_d$ is the channel delay spread. Selected parameters $C_{f^2,1}$, $C_{f^2,2}$, $C_{t^2,1}$, $C_{t^2,2}$, $C_{tf,1}$, $C_{tf,2}$ may be kept invariant for all channel conditions, while K factors may be tuned according to equations (20)-(22) based on corresponding parameters $C_{f^2,1}$, $C_{f^2,2}$, $C_{t^2,1}$, $C_{t^2,2}$, $C_{tf,1}$, $C_{tf,2}$, value of SNR, Doppler frequency and channel delay spread.

Equations (20)-(22) may not define the optimal solution for fitting parameters. As it will be shown by equation (31), the impact of the tuned K factors on each single factor may be quite involved, and each individual tuning K factor may not be optimized in a simple way. As shown later by simulations, the proposed method for automatic tuning of K factors may migrate smoothly and effectively among all LS plane-fitting methods with different parameter sets, and may provide the best overall estimation accuracy for all simulated channel conditions.

For automatic update of three K factors of higher order, three sets of C parameters from equations (20)-(22) may need to be pre-tuned. As an illustrative example, the term $k_{f^2}(SNR, f_d)$ may be restricted to satisfy the following two conditions:

$$k_{t2}(100, 400) = \frac{1}{C_{t2,2} \times 400 \times 100 + C_{t2,1}} = k_{pass}, \quad (23)$$

$$k_{t2}(1, 10) = \frac{1}{C_{t2,2} \times 10 \times 1 + C_{t2,1}} = k_{stop}, \quad (24)$$

where $k_{pass}$ may be a relatively small number, and $k_{stop}$ may be a large number. One particular feasible rule for a rough selection of two values given by equations (23) and (24) may be to set $k_{pass}$ to be 1/20 of the smallest singular value of the matrix A, while $k_{stop}$ may be set to be 50 times of the largest singular value of the matrix A. The other two sets of C parameters from equations (20) and (22) may be set in the similar manner. Following that, values of the fitting K factors may be updated according to the Doppler frequency, the channel delay spread and the level of SNR.

Figure 5:
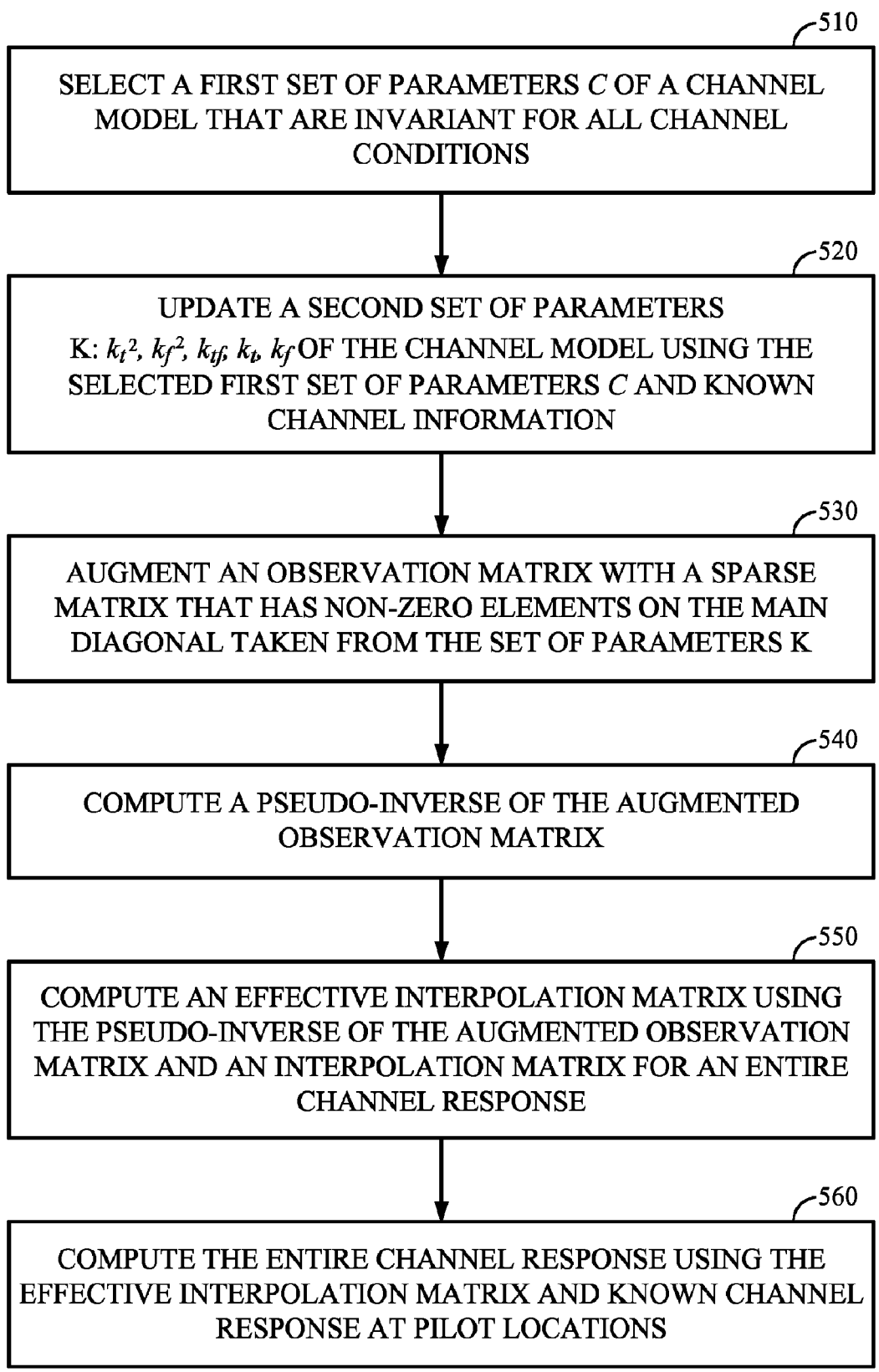
FIG. 5 illustrates a process of least square block channel estimation with automatic tuning of parameters in accordance with certain embodiments of the present disclosure.

FIG. 5 summarizes a process of the proposed automatic tuning of K factors for the block channel estimation based on the least square fitting algorithm. At 510, a first set of parameters C defined by equations (20)-(22) may be selected to be invariant for all channel conditions. At 520, a second set of parameters $k_{f^2}, k_{f^2}, k_{tf}, k_t, k_f$ (e.g., K factors) defined in equation (15) may be updated using the selected first set of parameters C and known channel information, as given by equations (20)-(22). At 530, the observation matrix A may be augmented with a sparse matrix that has non-zero elements at the main diagonal taken from the set of K factors, as given by equation (15).

At 540, a pseudo-inverse of the augmented observation matrix $A^{\#}_{Aug}$ may be computed. At 550, the effective interpolation matrix $G_{Aug}$ may be calculated based on the pseudo-inverse of the augmented observation matrix and the interpolation matrix for the channel response on the whole signal plane, as given by equation (18). At 560, channel estimates in the whole signal plane may be obtained using the effective interpolation matrix and channel estimates at pilot subcarriers, as given by equation (19).

Exemplary Simplified Implementation of the Least Square Channel Estimation

The augmented observation matrix $A_{Aug}$ may be defined for every set of tuning K factors. Thus, it is desirable to provide a relatively simple way to calculate the pseudo-inverse of the matrix $A_{Aug}$. The pseudo-inverse of the matrix $A_{Aug}$ defined by equation (15) may be calculated as:

$$A^{\#}_{Aug} = \left[\begin{pmatrix} A \\ K \end{pmatrix}^T \begin{pmatrix} A \\ K \end{pmatrix}\right]^{-1} \begin{pmatrix} A \\ K \end{pmatrix}^T = (A^T A + K^T K)^{-1} \begin{pmatrix} A \\ K \end{pmatrix}^T. \quad (25)$$

The inverse of matrix $A^T A + K^T K$ in equation (25) may be simplified as:

$$(A^T A + K^T K)^{-1} = B - BK^T(I + KBK^T)^{-1}KB, \quad (26)$$

where $B = (A^T A)^{-1}$ may be pre-calculated and stored in advance. Now, the channel parameters from equation (12) may be estimated as:

$$\hat{\theta} = \underbrace{\left(\underbrace{\frac{I}{P \times P} - \frac{B}{P \times P} \frac{K^T}{P \times M}\left(\underbrace{\frac{I}{M \times M} + KBK^T}\right)^{-1} K\right) \underbrace{A^{\#}_{Aug} H_p}_{\theta_{LS}}}_{K_{Aug}} = K_{Aug} \cdot \theta_{LS}, \quad (27)$$

where M is the number constraints to be added (number of rows of K) and P is the total number of channel parameters from equation (12) to be estimated according to the channel model defined by equation (10).

According to equation (27), instead of calculating the pseudo-inverse of the augmented matrix A of size $((N+M) \times P)$, it may be only required to calculate the inverse of matrix $(I + KBK^T)$ of size $(M \times M)$, where N is the number of pilot locations in the signal plane.

In an exemplary case when only three second-order terms of the channel model from equation (10) are controlled, the matrix K from equations (25)-(27) may be just a (3×6) sparse matrix, which may have three non-zero elements on the diagonal, as given by:

$$K = \begin{bmatrix} k_{t2} & 0 & 0 & 0 & 0 & 0 \\ 0 & k_{f2} & 0 & 0 & 0 & 0 \\ 0 & 0 & k_{tf} & 0 & 0 & 0 \end{bmatrix}. \quad (28)$$

Therefore, instead of calculating the pseudo inverse of large augmented matrix $A_{Aug}$ of size (N×P)=(20×6), it may be only required to calculate the inverse of a (3×3) matrix.

It should be noted that if the matrix A has orthogonal columns, then $B = (A^T A)^{-1}$ may be a diagonal matrix, and the matrix $K_{Aug}$ from equation (27) may also become a diagonal matrix. In this case, the computational complexity of the inversion of the augmented observation matrix given by equation (25) can be further simplified.

Exemplary Simulation Results

The mean square errors (MSE) of different interpolation schemes applied in various channel environments are shown in FIGS. 6-12. It can be assumed a transmission of 10 OFDM symbols that may correspond to one signal cluster in the WiMAX design. The proposed method for automatic tuning of K parameters given by equations (20)-(22) may be compared by simulations with: the LS interpolator from equation (10) with DC,$\Delta t,\Delta f,\Delta t^2,\Delta f^2,\Delta tf$ terms, the LS interpolator from equation (10) with DC,$\Delta t,\Delta f,\Delta t^2,\Delta f^2$ terms, the LS interpolator from equation (10) with DC,$\Delta t,\Delta f,\Delta f^2,\Delta tf$ terms, the LS interpolator from equation (10) with DC,$\Delta t,\Delta f,\Delta f^2$ terms, the LS interpolator from equation (10) with DC,$\Delta t,\Delta f$ terms, and with two-dimensional optimal Wiener interpolator defined by equation (7) that assumes a perfect channel correlation information.

It can be observed from FIGS. 6-12 that the proposed method for block channel estimation based on automatically tuned K factors may provide the best overall performance for a broad range of SNR values in different channel environments with various levels of channel delay spread and Doppler frequency. The analyzed channel environments may be Pedestrian A channel with a speed of subscriber station of 3 km/h, Pedestrian B channel with the speed of subscriber station of 8 km/h, and Vehicular A channel with the speed of subscriber station in the span between 30 km/h and 200 km/h.

Figure 5A:
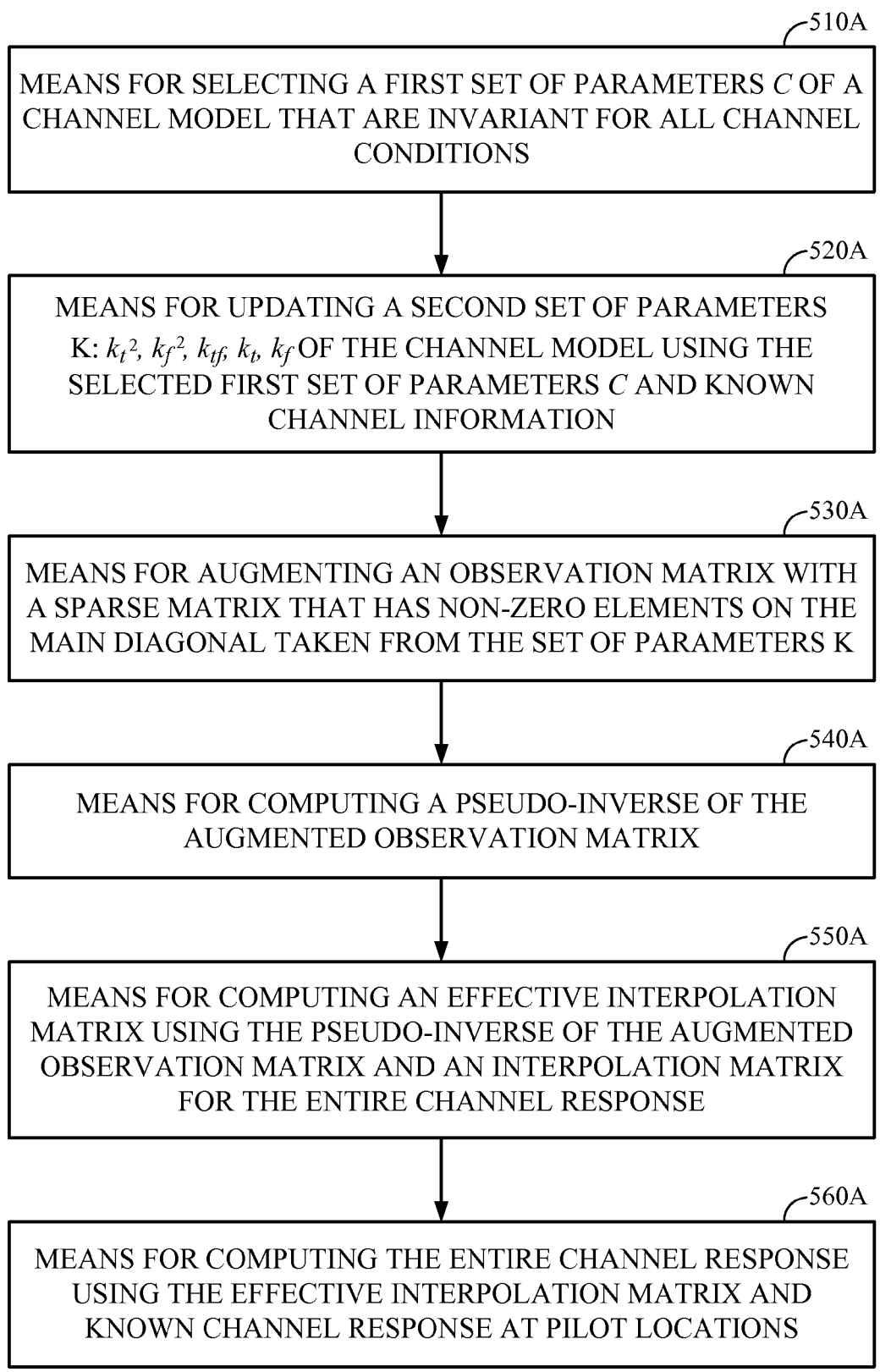
FIG. 5A illustrates example components capable of performing the operations illustrated in FIG. 5.
Figure 6:
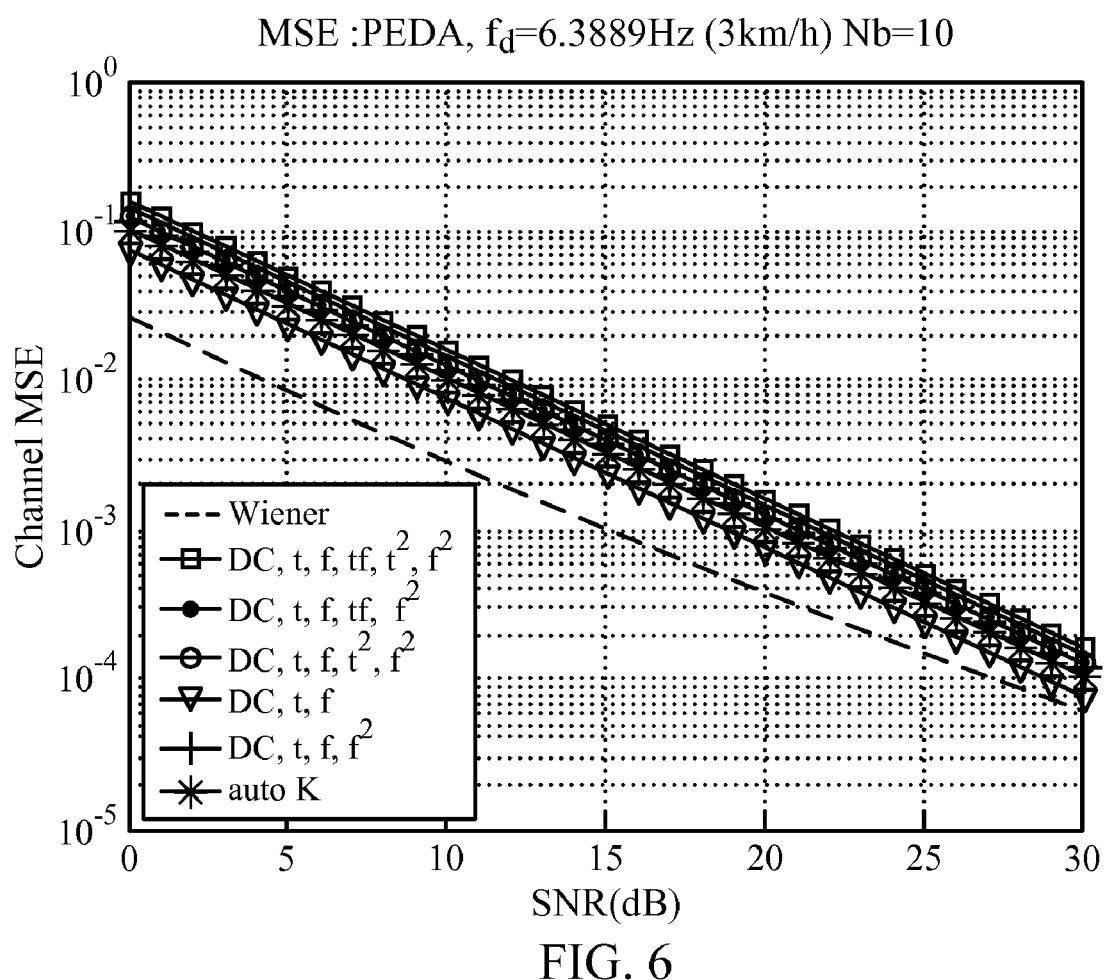
FIG. 6 illustrates a mean square error (MSE) of different channel estimation algorithms for Pedestrian A channels with velocity of a mobile station (MS) of 3 km/h.
Figure 7:
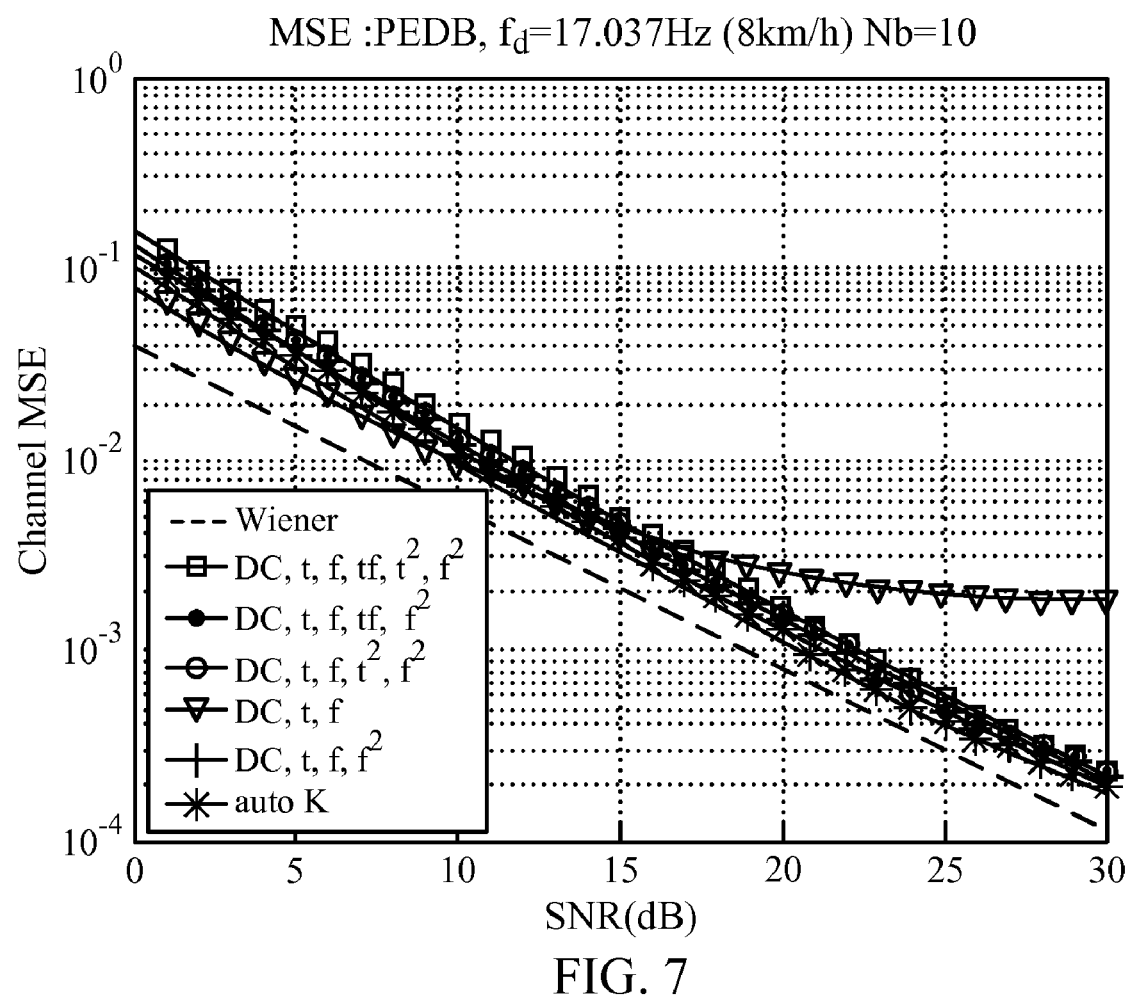
FIG. 7 illustrates the MSE of different channel estimation algorithms for Pedestrian B channels with velocity of the MS of 8 km/h.
Figure 8:
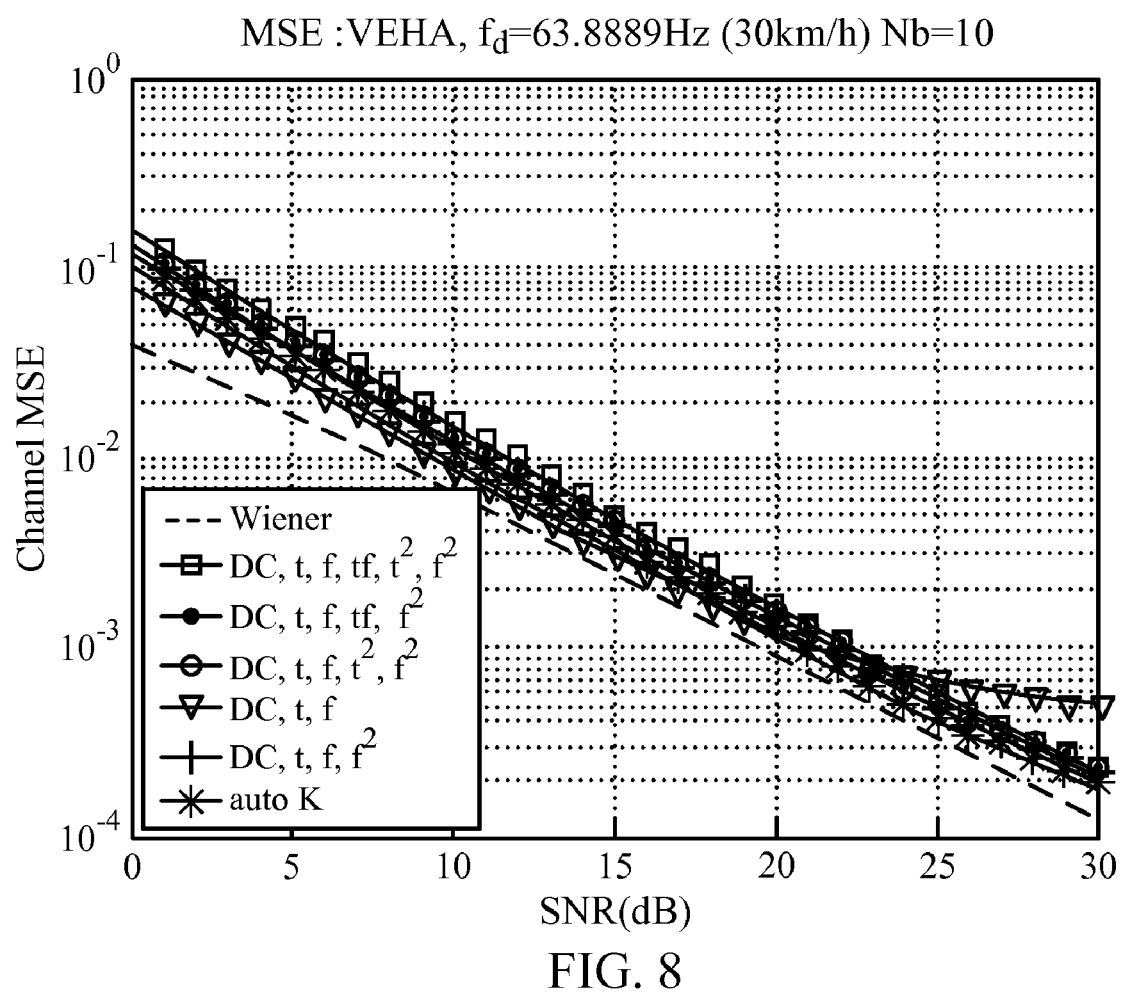
FIG. 8 illustrates the MSE of different channel estimation algorithms for Vehicular A channels with velocity of the MS of 30 km/h.
Figure 9:
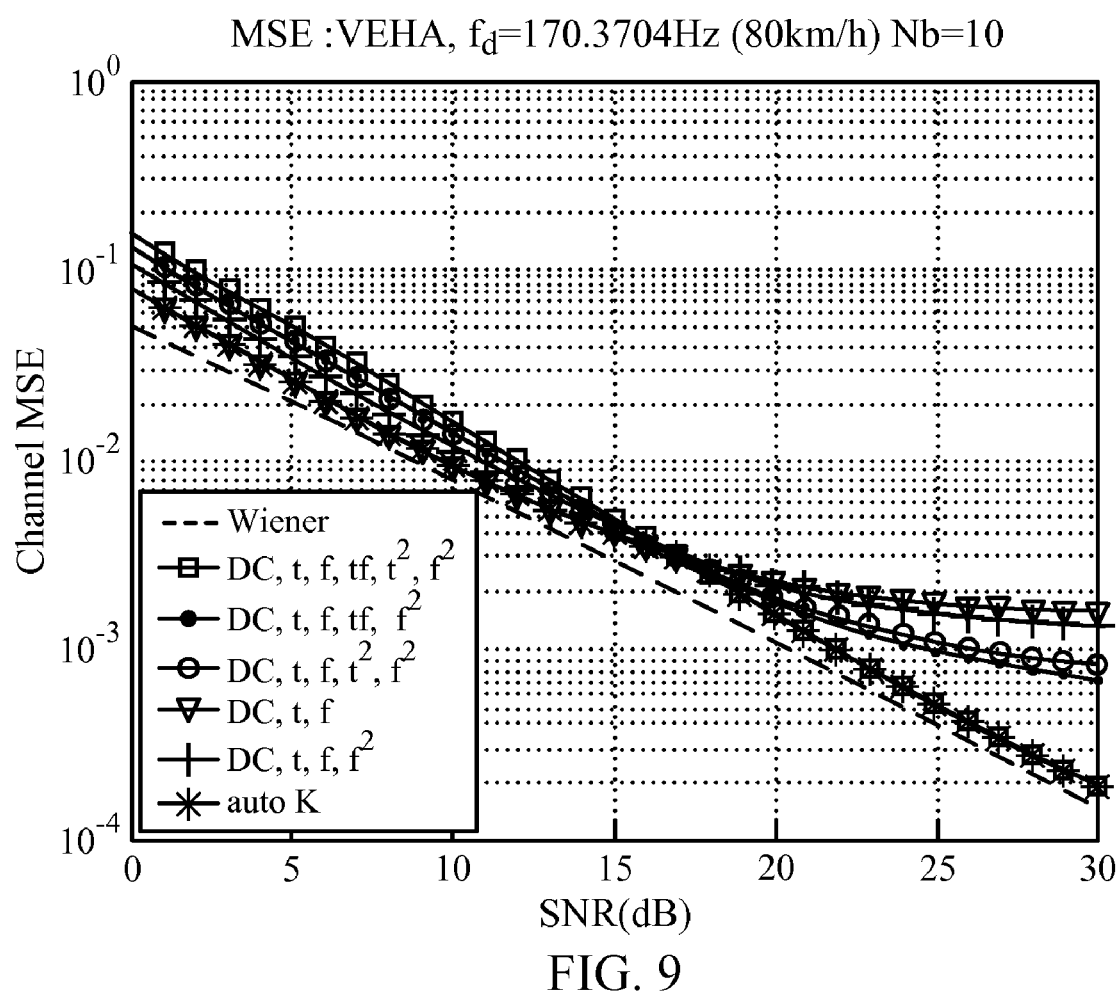
FIG. 9 illustrates the MSE of different channel estimation algorithms for Vehicular A channels with velocity of the MS of 80 km/h.
Figure 10:
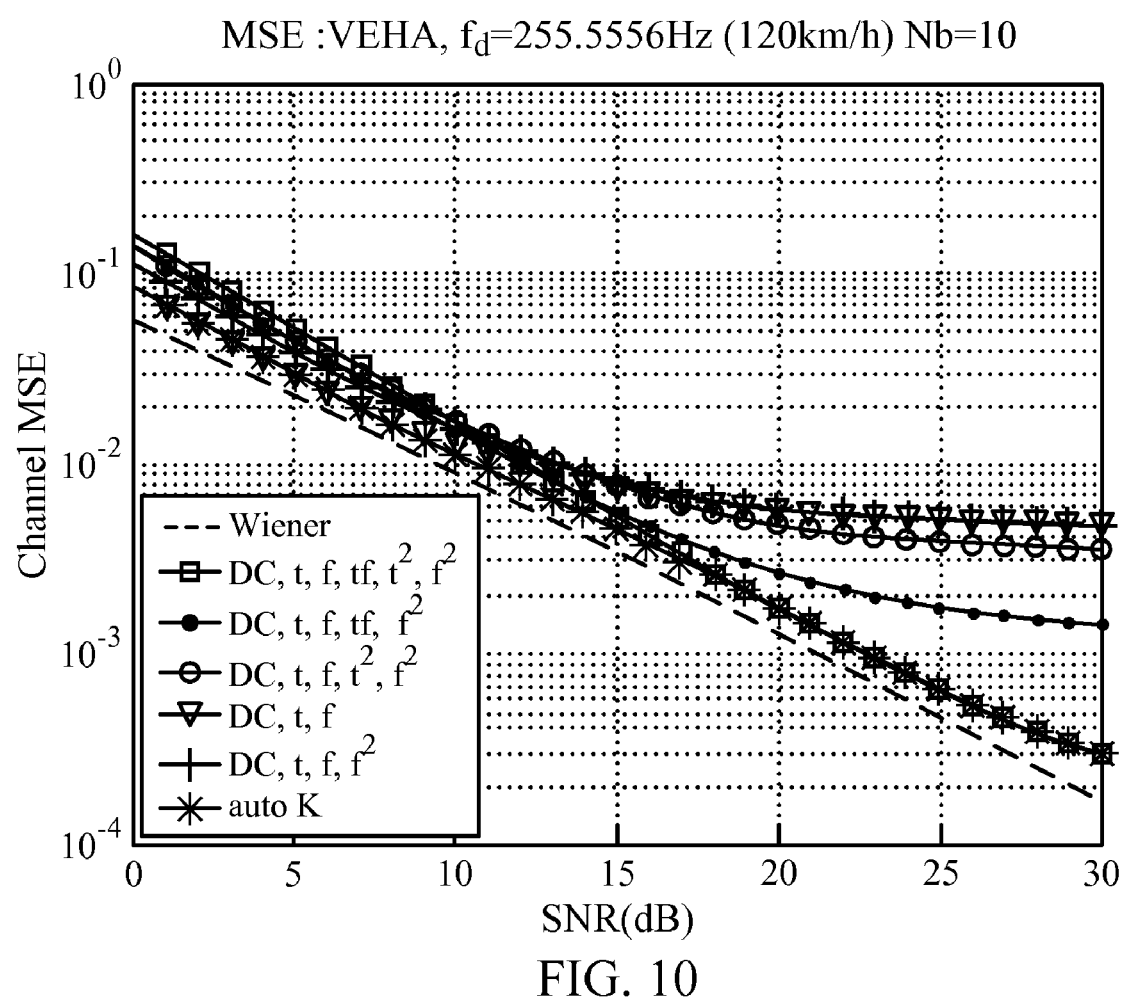
FIG. 10 illustrates the MSE of different channel estimation algorithms for Vehicular A channels with velocity of the MS of 120 km/h.
Figure 11:
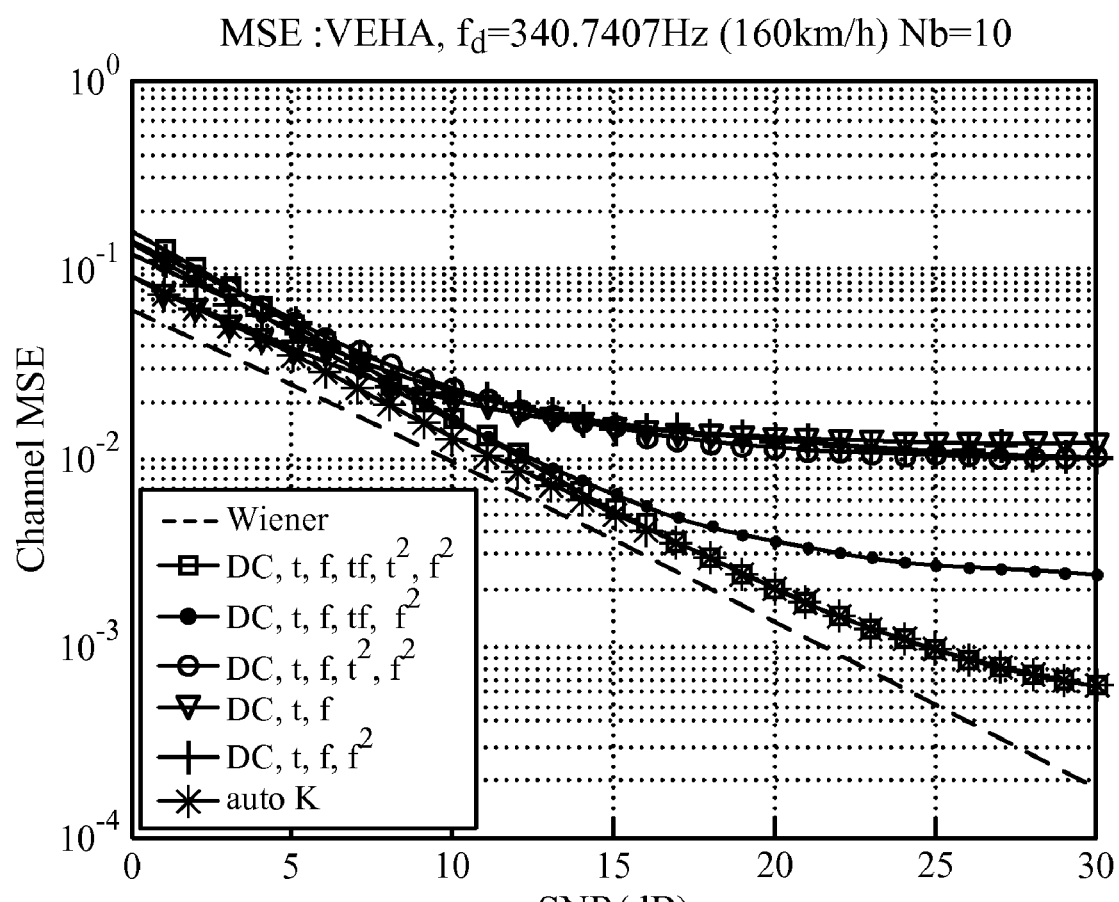
FIG. 11 illustrates the MSE of different channel estimation algorithms for Vehicular A channels with velocity of the MS of 160 km/h.
Figure 12:
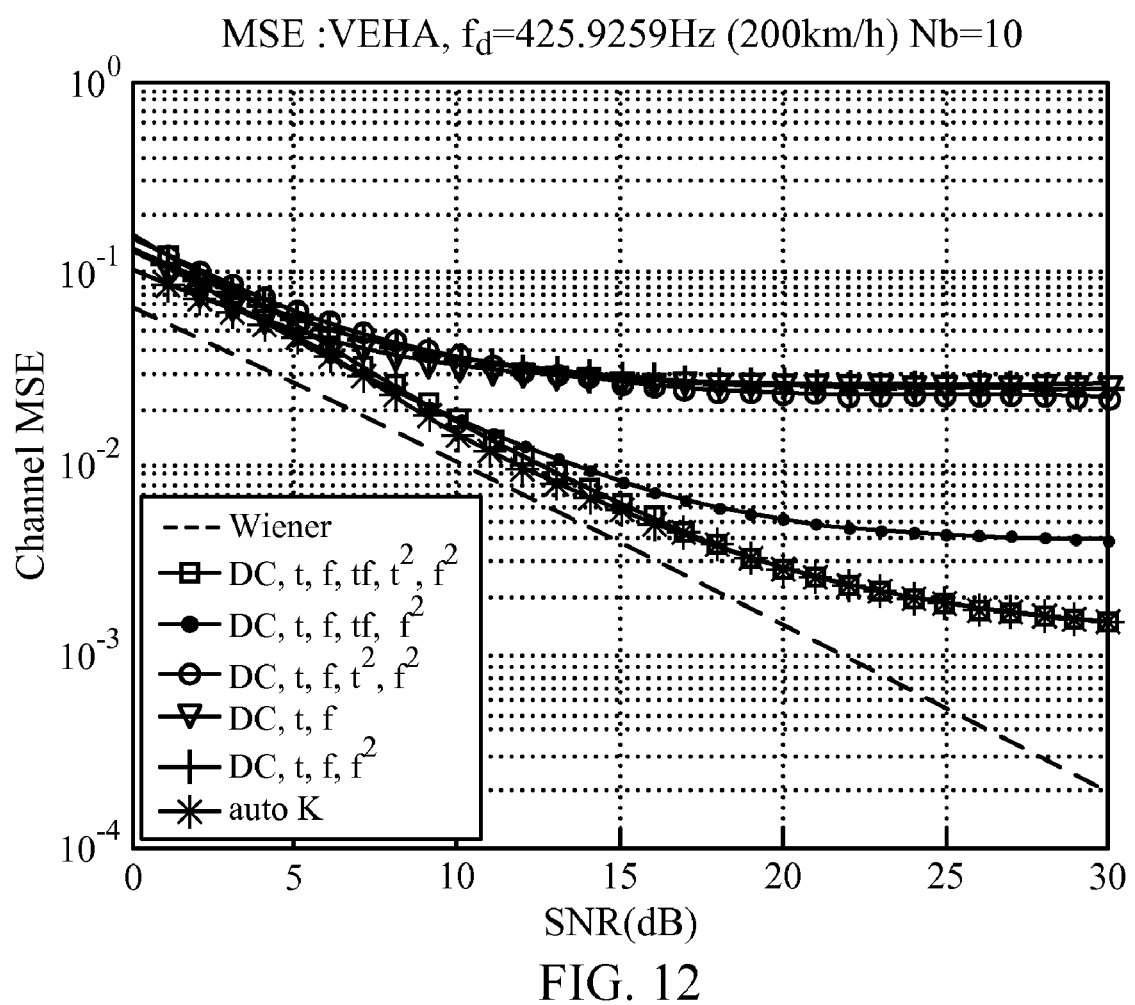
FIG. 12 illustrates the MSE of different channel estimation algorithms for Vehicular A channels with velocity of the MS of 200 km/h.

The various operations of methods described above may be performed by various hardware and/or software component(s) and/or module(s) corresponding to means-plus-function blocks illustrated in the Figures. For example, blocks 510-560 illustrated in FIG. 5 correspond to means-plus-function blocks 510A-560A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for performing a channel estimation, comprising:
   receiving wireless signals on a channel, the channel having channel information;
   selecting a first set of tuning parameters;
   updating of a second set of tuning parameters of a channel model based at least on the selected first set of tuning parameters and the channel information;
   augmenting an observation matrix with a sparse matrix having non-zero elements on the main diagonal taken from the second set of tuning parameters;
   computing a pseudo-inverse of the augmented observation matrix;
   computing an effective interpolation matrix based on the pseudo-inverse of the augmented observation matrix and an interpolation matrix for the entire channel response; and computing channel estimates based on the effective interpolation matrix and known channel estimates at pilot locations.

2. The method of claim 1, wherein selected values of parameters from the first set of tuning parameters are related to a pilot structure and to a design criteria, and are invariant for a plurality of channel conditions.

3. The method of claim 1, wherein updating of the second set of tuning parameters comprises updating for every channel condition from the plurality of channel conditions.

4. The method of claim 1, wherein the second set of tuning parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

5. The method of claim 1, wherein the channel information contains information about signal-to-noise ratio (SNR), Doppler frequency and delay spread obtained from a synchronization process and from a preamble channel estimation.

6. The method of claim 5, wherein the synchronization process comprises a frequency tracking loop and a time tracking loop.

7. The method of claim 1, wherein computing the pseudo-inverse of the augmented observation matrix comprises:
- pre-calculating a matrix based on the observation matrix to obtain a pre-calculated matrix;
- generating a sparse matrix with non-zero elements on the main diagonal taken from the second set of tuning parameters;
- generating a product matrix based on the pre-calculated matrix and the sparse matrix;
- inverting the product matrix to obtain an inverted product matrix; and
- computing the pseudo-inverse of the augmented observation matrix using the pre-calculated matrix, the sparse matrix and the inverted product matrix.

8. The method of claim 7, further comprising:
computing a set of channel parameters that describes the channel on a given plane based on the computed pseudo-inverse of the augmented observation matrix and known channel estimates at pilot locations.

9. The method of claim 8, wherein the set of channel parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

10. An apparatus for performing a channel estimation, comprising:
- logic for receiving wireless signals on a channel, the channel having channel information;
- logic for selecting a first set of tuning parameters;
- logic for updating of a second set of tuning parameters of a channel model based at least on the selected first set of tuning parameters and the channel information;
- logic for augmenting an observation matrix with a sparse matrix having non-zero elements on the main diagonal taken from the second set of tuning parameters;
- logic for computing a pseudo-inverse of the augmented observation matrix;
- logic for computing an effective interpolation matrix based on the pseudo-inverse of the augmented observation matrix and an interpolation matrix for the entire channel response; and
- logic for computing channel estimates based on the effective interpolation matrix and known channel estimates at pilot locations.

11. The apparatus of claim 10, wherein selected values of parameters from the first set of tuning parameters are related to a pilot structure and to a design criteria, and are invariant for a plurality of channel conditions.

12. The apparatus of claim 10, wherein the logic for updating of the second set of tuning parameters comprises logic for updating for every channel condition from the plurality of channel conditions.

13. The apparatus of claim 10, wherein the second set of tuning parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

14. The apparatus of claim 10, wherein the channel information contains information about signal-to-noise ratio (SNR), Doppler frequency and delay spread obtained from a synchronization process and from a preamble channel estimation.

15. The apparatus of claim 14, wherein the synchronization process comprises a frequency tracking loop and a time tracking loop.

16. The apparatus of claim 10, wherein the logic for computing the pseudo-inverse of the augmented observation matrix comprises:
- logic for pre-calculating a matrix based on the observation matrix to obtain a pre-calculated matrix;
- logic for generating a sparse matrix with non-zero elements on the main diagonal taken from the second set of tuning parameters;
- logic for generating a product matrix based on the pre-calculated matrix and the sparse matrix;
- logic for inverting the product matrix to obtain an inverted product matrix; and
- logic for computing the pseudo-inverse of the augmented observation matrix using the pre-calculated matrix, the sparse matrix and the inverted product matrix.

17. The apparatus of claim 16, further comprising:
logic for computing a set of channel parameters that describes the channel on a given plane based on the computed pseudo-inverse of the augmented observation matrix and known channel estimates at pilot locations.

18. The apparatus of claim 17, wherein the set of channel parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

19. An apparatus for performing a channel estimation, comprising:
- means for receiving wireless signals on a channel, the channel having channel information;
- means for selecting a first set of tuning parameters;
- means for updating of a second set of tuning parameters of a channel model based at least on the selected first set of tuning parameters and the channel information;
- means for augmenting an observation matrix with a sparse matrix having non-zero elements on the main diagonal taken from the second set of tuning parameters;
- means for computing a pseudo-inverse of the augmented observation matrix;
- means for computing an effective interpolation matrix based on the pseudo-inverse of the augmented observation matrix and an interpolation matrix for the entire channel response; and
- means for computing channel estimates based on the effective interpolation matrix and known channel estimates at pilot locations.

20. The apparatus of claim 19, wherein selected values of parameters from the first set of tuning parameters are related to a pilot structure and to a design criteria, and are invariant for a plurality of channel conditions.

21. The apparatus of claim 19, wherein the means for updating of the second set of tuning parameters comprises means for updating for every channel condition from the plurality of channel conditions.

22. The apparatus of claim 19, wherein the second set of tuning parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

23. The apparatus of claim 19, wherein the channel information contains information about signal-to-noise ratio (SNR), Doppler frequency and delay spread obtained from a synchronization process and from a preamble channel estimation.

24. The apparatus of claim 23, wherein the synchronization process comprises a frequency tracking loop and a time tracking loop.

25. The apparatus of claim 19, wherein the means for computing the pseudo-inverse of the augmented observation matrix comprises:
- means for pre-calculating a matrix based on the observation matrix to obtain a pre-calculated matrix;
- means for generating a sparse matrix with non-zero elements on the main diagonal taken from the second set of tuning parameters;
- means for generating a product matrix based on the pre-calculated matrix and the sparse matrix;
- means for inverting the product matrix to obtain an inverted product matrix; and
- means for computing the pseudo-inverse of the augmented observation matrix using the pre-calculated matrix, the sparse matrix and the inverted product matrix.

26. The apparatus of claim 25, further comprising:
- means for computing a set of channel parameters that describes the channel on a given plane based on the computed pseudo-inverse of the augmented observation matrix and known channel estimates at pilot locations.

27. The apparatus of claim 26, wherein the set of channel parameters include at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

28. A computer-program product for performing a channel estimation, comprising a computer readable medium having instructions stored thereon, the instructions being executable by one or more processors and the instructions comprising:
- instructions for receiving wireless signals on a channel, the channel having channel information;
- instructions for selecting a first set of tuning parameters;
- instructions for updating of a second set of tuning parameters of a channel model based at least one the selected first set of tuning parameters and the channel information;
- instructions for augmenting an observation matrix with a sparse matrix having non-zero elements on the main diagonal taken from the second set of tuning parameters;
- instructions for computing a pseudo-inverse of the augmented observation matrix;
- instructions for computing an effective interpolation matrix based on the pseudo-inverse of the augmented observation matrix and an interpolation matrix for the entire channel response; and
- instructions for computing channel estimates based on the effective interpolation matrix and known channel estimates at pilot locations.

29. The computer-program product of claim 28, wherein selected values of parameters from the first set of tuning parameters are related to a pilot structure and to a design criteria, and are invariant for a plurality of channel conditions.

30. The computer-program product of claim 28, wherein the instructions for updating of the second set of tuning parameters comprise instructions for updating for every channel condition from the plurality of channel conditions.

31. The computer-program product of claim 28, wherein the second set of tuning parameters includes at least one of:
- a second order derivative in frequency of the channel response,
- a second order derivative in time of the channel response,
- a second order derivative in time and frequency of the channel response,
- a slope in time of the channel response,
- a slope in frequency of the channel response, and
- a constant (DC) term.

32. The computer-program product of claim 28, wherein the channel information contains information about signal-to-noise ratio (SNR), Doppler frequency and delay spread obtained from a synchronization process and from a preamble channel estimation.

33. The computer-program product of claim 31, wherein the synchronization process comprises a frequency tracking loop and a time tracking loop.

34. The computer-program product of claim 28, wherein the instructions for computing the pseudo-inverse of the augmented observation matrix comprise:
- instructions for pre-calculating a matrix based on the observation matrix to obtain a pre-calculated matrix;
- instructions for generating a sparse matrix with non-zero elements on the main diagonal taken from the second set of tuning parameters;

instructions for generating a product matrix based on the pre-calculated matrix and the sparse matrix;

instructions for inverting the product matrix to obtain an inverted product matrix; and instructions for computing the pseudo-inverse of the augmented observation matrix using the pre-calculated matrix, the sparse matrix and the inverted product matrix.

35. The computer-program product of claim 34, wherein the instructions further comprise:

instructions for computing a set of channel parameters that describes the channel on a given plane based on the computed pseudo-inverse of the augmented observation matrix and known channel estimates at pilot locations.

36. The computer-program product of claim 35, wherein the set of channel parameters includes at least one of:

a second order derivative in frequency of the channel response, a second order derivative in time of the channel response, a second order derivative in time and frequency of the channel response, a slope in time of the channel response, a slope in frequency of the channel response, and a constant (DC) term.

* * * * *